(12) United States Patent
Chande et al.

(10) Patent No.: US 11,729,726 B2
(45) Date of Patent: Aug. 15, 2023

(54) POWER ADAPTIVE MULTI-SUBBAND CLEAR CHANNEL ASSESSMENT

(71) Applicant: QUALCOMM Incorporated, San Diego, CA (US)

(72) Inventors: Vinay Chande, San Diego, CA (US); Arumugam Chendamarai Kannan, San Diego, CA (US); Srinivas Yerramalli, San Diego, CA (US); Giovanni Chisci, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/397,741

(22) Filed: Aug. 9, 2021

(65) Prior Publication Data

US 2022/0053430 A1    Feb. 17, 2022

Related U.S. Application Data

(60) Provisional application No. 63/064,366, filed on Aug. 11, 2020.

(51) Int. Cl.
*H04W 52/16* (2009.01)
*H04W 52/14* (2009.01)
*H04W 52/30* (2009.01)

(52) U.S. Cl.
CPC ......... *H04W 52/16* (2013.01); *H04W 52/146* (2013.01); *H04W 52/30* (2013.01)

(58) Field of Classification Search
CPC ... H04W 52/16; H04W 52/146; H04W 52/30; H04W 52/325; H04W 52/34
See application file for complete search history.

(56) References Cited

U.S. PATENT DOCUMENTS

| | | | |
|---|---|---|---|
| 2017/0105217 A1* | 4/2017 | Kwon | H04W 52/245 |
| 2018/0007643 A1* | 1/2018 | Tiirola | H04W 52/367 |

(Continued)

FOREIGN PATENT DOCUMENTS

| | | |
|---|---|---|
| EP | 3255917 A1 | 12/2017 |
| WO | 2016119839 A1 | 8/2016 |

(Continued)

OTHER PUBLICATIONS

International Search Report and Written Opinion—PCT/US2021/045439—ISA/EPO—dated Nov. 30, 2021.

*Primary Examiner* — John J Lee
(74) *Attorney, Agent, or Firm* — Qualcomm Incorporated

(57) ABSTRACT

A configuration to configure an apparatus to perform a clear channel assessment based on one or more transmission power levels. The apparatus measures at least one energy sensing measurement over an operating channel. The apparatus determines whether the operating channel is available for transmission based on a threshold determination for one or more transmission power levels. The apparatus transmitting on the operating channel upon the determination that the operating channel is available for transmission for the one or more transmission power levels, wherein the one or more transmission power levels are less than the threshold determination.

28 Claims, 16 Drawing Sheets

(56) References Cited

U.S. PATENT DOCUMENTS

| | | | | |
|---|---|---|---|---|
| 2018/0132278 | A1* | 5/2018 | Oteri | H04W 74/0808 |
| 2018/0242176 | A1* | 8/2018 | Yang | H04W 52/54 |
| 2020/0413349 | A1* | 12/2020 | Wilhelmsson | H04L 1/0009 |

FOREIGN PATENT DOCUMENTS

| | | | |
|---|---|---|---|
| WO | 2019170221 | A1 | 9/2019 |
| WO | 2020033363 | A1 | 2/2020 |

\* cited by examiner

US 11,729,726 B2

POWER ADAPTIVE MULTI-SUBBAND CLEAR CHANNEL ASSESSMENT

CROSS REFERENCE TO RELATED APPLICATION(S)

This application claims the benefit of and priority to U.S. Provisional Application Ser. No. 63/064,366, entitled "Power Adaptive Multi-Subband Clear Channel Assessment" and filed on Aug. 11, 2020, which is expressly incorporated by reference herein in its entirety.

TECHNICAL FIELD

The present disclosure relates generally to communication systems, and more particularly, to a configuration for a clear channel assessment

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus measures at least one energy sensing measurement over an operating channel. The apparatus determines whether the operating channel is available for transmission based on a threshold determination for one or more transmission power levels. The apparatus transmits on the operating channel upon the determination that the operating channel is available for transmission for the one or more transmission power levels. The one or more transmission power levels are less than the threshold determination.

In an aspect of the disclosure, a method, a computer-readable medium, and an apparatus are provided. The apparatus may be a device at a base station. The device may be a processor and/or a modem at a base station or the base station itself. The apparatus measures at least one energy sensing measurement over an operating channel. The apparatus determines whether the operating channel is available for transmission based on a threshold determination for one or more transmission power levels. The apparatus transmits on the operating channel upon the determination that the operating channel is available for transmission for the one or more transmission power levels. The one or more transmission power levels are less than the threshold determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
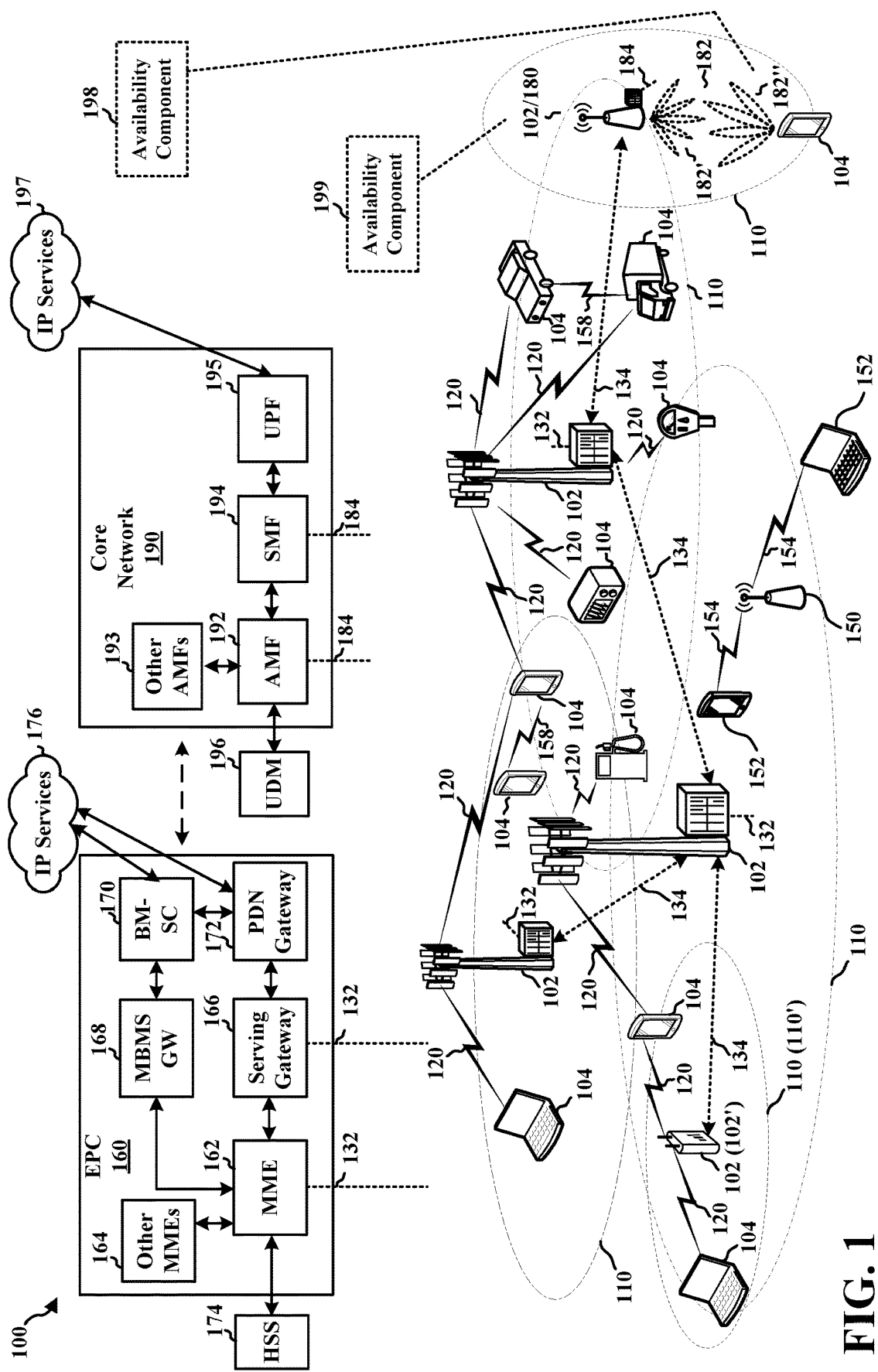
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to perform a clear channel assessment based on one or more transmission power levels. For example, the UE 104 may comprise an availability component 198 configured to determine whether an operating channel is available for transmission based on a threshold determination for one or more transmission power levels. The UE 104 measures at least one energy sensing measurement over an operating channel. The UE 104 determines whether the operating channel is available for transmission based on a threshold determination for one or more transmission power levels. The UE 104 transmits on the operating channel upon the determination that the operating channel is available for transmission for the one or more transmission power levels, wherein the one or more transmission power levels are less than the threshold determination.

Referring again to FIG. 1, in certain aspects, the base station 180 may be configured to perform a clear channel assessment based on one or more transmission power levels. For example, the base station 180 may comprise an availability component 199 configured to determine whether an operating channel is available for transmission based on a threshold determination for one or more transmission power levels. The base station 180 measures at least one energy sensing measurement over an operating channel. The base station 180 determines whether the operating channel is available for transmission based on a threshold determination for one or more transmission power levels. The base station 180 transmits on the operating channel upon the determination that the operating channel is available for transmission for the one or more transmission power levels, wherein the one or more transmission power levels are less than the threshold determination.

Although the following description may be focused on 5G NR, the concepts described herein may be applicable to other similar areas, such as LTE, LTE-A, CDMA, GSM, and other wireless technologies.

Figure 2:
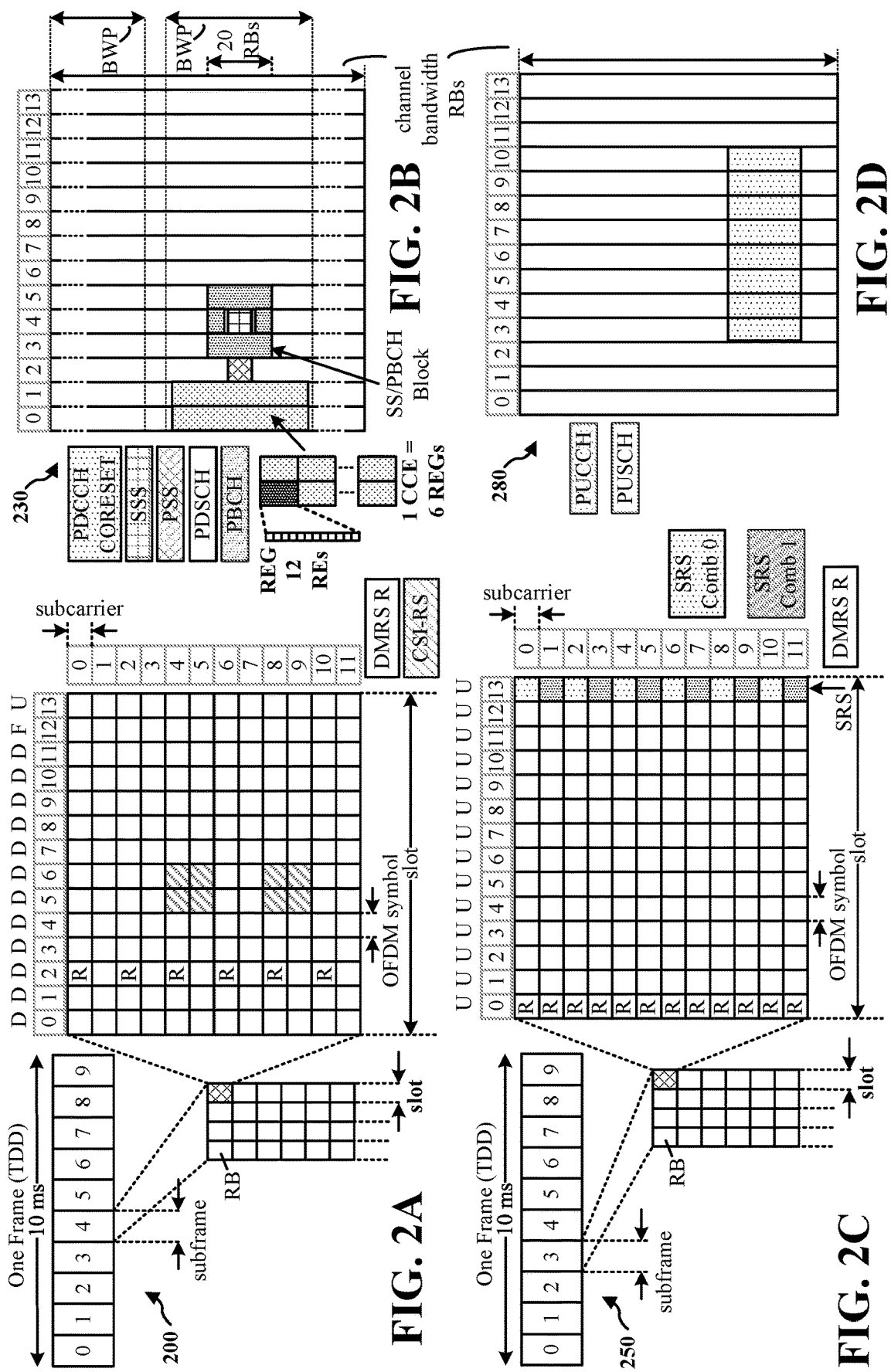
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
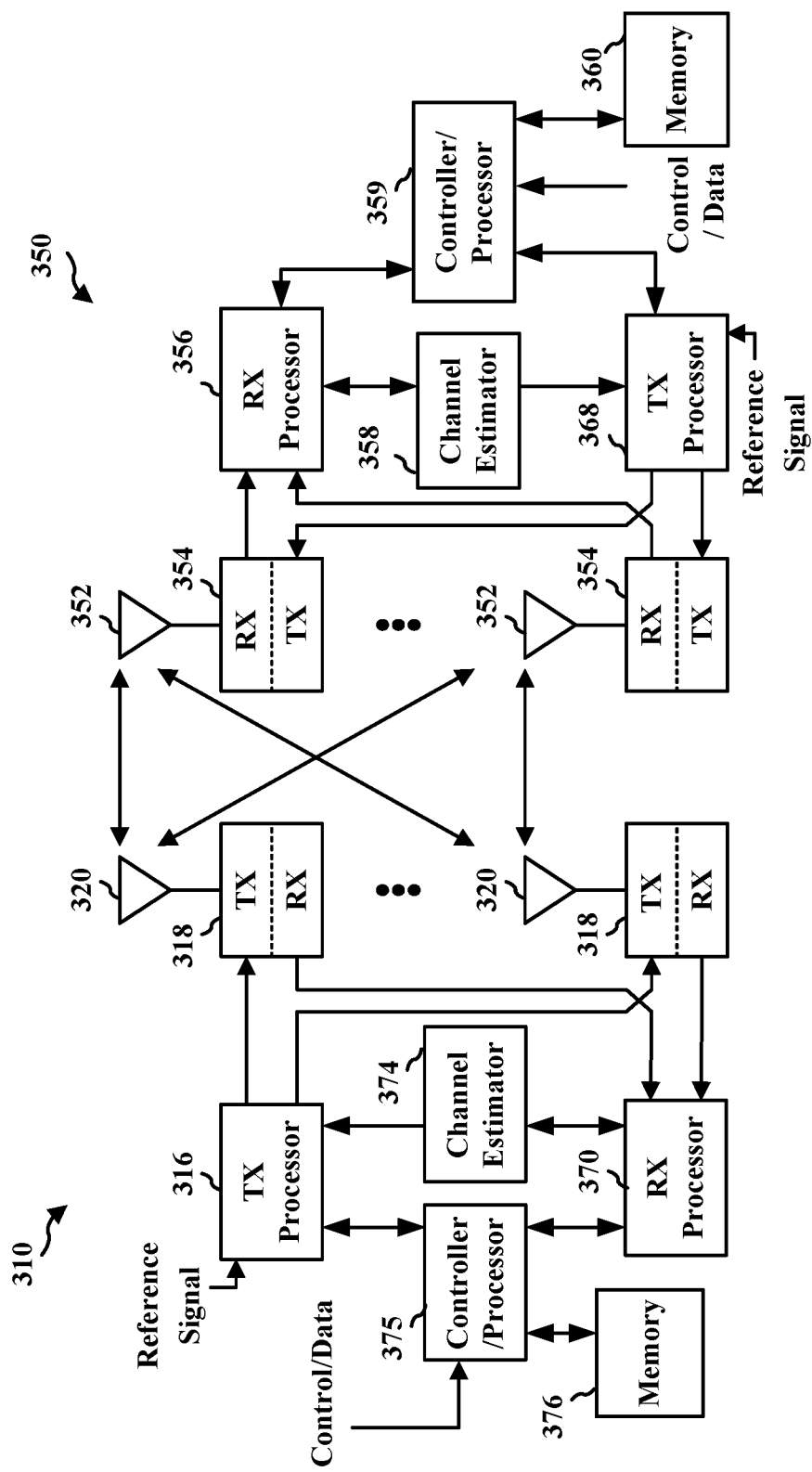
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In unlicensed spectrum, e.g., sub-6 GHz range, has a certain bandwidth that is less than the bandwidth of the 60 GHz unlicensed spectrum. The unlicensed spectrum of 60 GHz may allow for a deployment of nodes with wide variety of bandwidths, which may be known as node operating channel heterogeneity. The 60 GHz unlicensed spectrum may include aggressor node bandwidth heterogeneity where an aggressor node may cause frequency selective interference, as well as victim node bandwidth heterogeneity where a victim node may experience frequency selective interference. With NR technologies, a serving cell bandwidth heterogeneity may allow for a gNB (e.g., base station) and served UEs to use different bandwidths or BWPs for operation on a single network operating channel. In some instances, no common agreed channelization may be present. In some instances, non-NR victims and/or aggressors may use wider bands (e.g., 2.16 GHz wireless gigabit (WiGig)).

Figure 4:
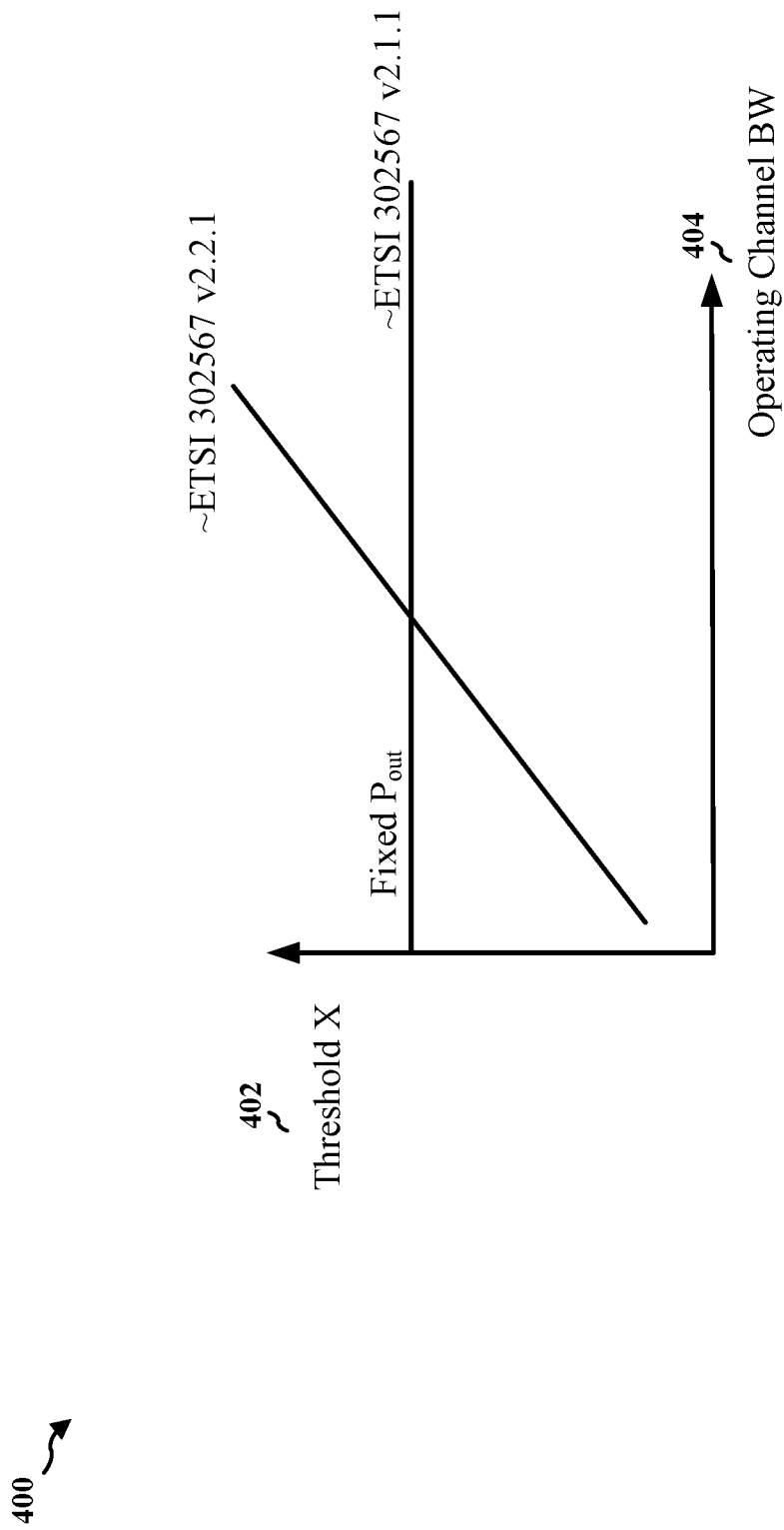
FIG. 4 illustrates an example of a sensing threshold.

FIG. 4 illustrates an example 400 of a sensing threshold. A sensing threshold 402 for a clear channel assessment procedure may be based on the output power of the device within the operating channel bandwidth 404. The sensing threshold $X_T$ ($P_{out}$) may be a function of the maximum effective isotropic radiated power (EIRP) of the device. For example, the sensing threshold, at 60 GHz, as described in ETSI EN 302567 v2.1.1 may be expressed by the following equation:

$$X_T(P_{out}) = -47 \text{ dBm} + (40 \text{ dBm} - P_{out})$$

The sensing threshold may be independent of the bandwidth of the operating channel. The sensing threshold at 60 GHz, as described in ETSI EN 302567 v2.2.1 may be expressed by the following equation:

$$X_T(P_{out}) = -80 \text{ dBm} + 10*\log 10(B) + (P\_\max \text{ dBm} - P_{out} \text{ dBm})$$

In some instances, such as for load based equipment at 5 GHz having a transmission bandwidth B and EIRP $P_{out}$, the sensing threshold may be expressed by the following equation:

$$X_T(P_{out}) = -73 \text{ dBm} + 10*\log 10(B) + (23 \text{ dBm} - P_{out})$$

The threshold may increase with a bandwidth contended for a fixed EIRP $P_{out}$. In such instances, the sensing threshold may be a function of the bandwidth B.

The sensing threshold, at sub-6 GHz unlicensed spectrum is assumed to be performed in a channel of 20 MHz listen before talk (LBT) bandwidth. The threshold for transmitting at a maximum power may include a fixed high threshold (e.g., −52 dbm) per 20 MHz in the absence of other technologies, otherwise, the threshold may be determined as a function of the channel bandwidth, LBT bandwidth (e.g., 20 MHz), and output power relationship.

Figure 5:
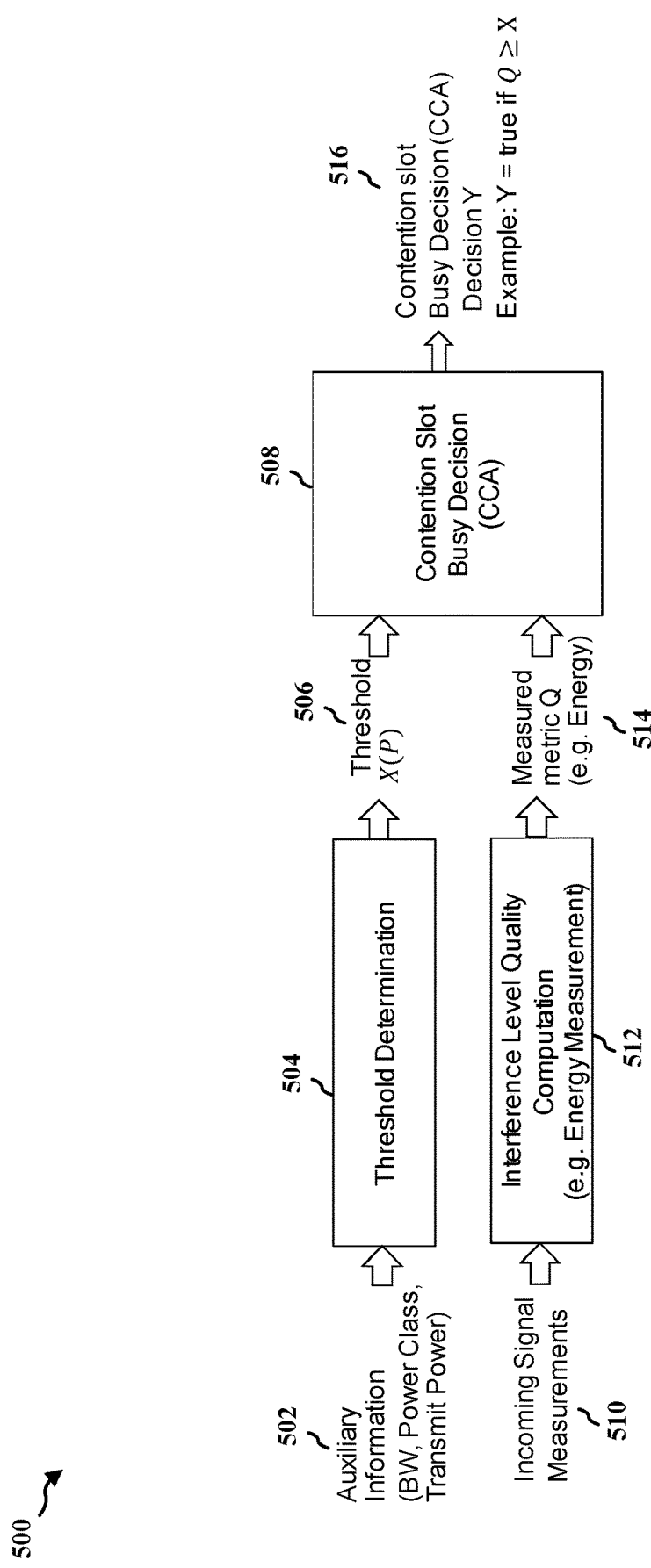
FIG. 5 illustrates an example of a clear channel assessment.

FIG. 5 illustrates an example 500 of a clear channel assessment. An LBT or carrier sense unit at a contending node in an unlicensed band operation may determine whether a contention slot (e.g., 9 μs for sub-6 GHz, 5 μs for 60 GHz) is available or busy for a node. The LBT or carrier sense unit may determine whether the contention slot is busy or available by measuring a sensed interference level quality metric (e.g., energy received) is greater than a threshold. The energy may be measured over the bandwidth of an operating channel for sensing the interference level. The threshold may be a function typically of a power class, maximum transmit power, or EIRP.

As shown in FIG. 5, an interference level quality computation 512 (e.g., energy measurement) may be computed on incoming signal measurements 510, which may determine the measured metric Q 514 (e.g., energy). A threshold determination 504 may be based on auxiliary information 502, such as but not limited to the bandwidth, the power class, or the transmit power. The measured metric Q 514 is compared against the threshold 506 to determine the contention slot busy decision 508 (e.g., clear channel assessment). In some instances, the contention slot decision 516 may indicate that the contention slot is busy if the measured metric Q 514 is greater than or equal to the threshold X(P) 506.

Figure 6:
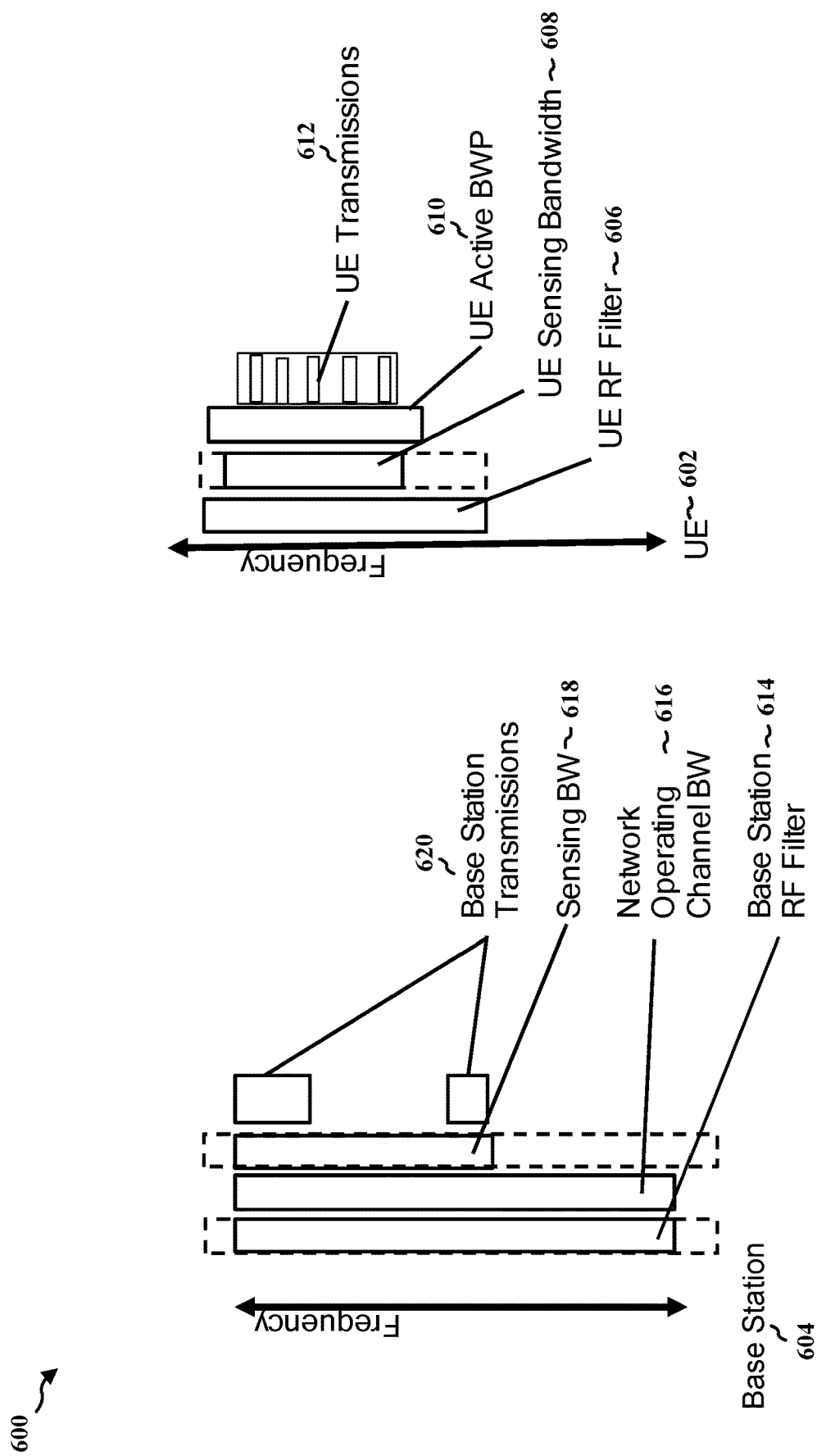
FIG. 6 illustrates an example of a relationship of a sensing bandwidth and transmission bandwidths.

FIG. 6 illustrates an example 600 of a relationship of sensing bandwidths and transmission bandwidths. The example 600 of FIG. 6 includes drawings of bandwidths for a base station 604 and a UE 602. The UE 602 includes a UE RF filter 606, a UE sensing bandwidth 608, a UE active BWP 610, and UE transmissions 612. The base station 604 includes a base station RF filter 614, a network operating channel bandwidth 616, a sensing bandwidth 618, and base station transmissions 620. The UE 602 and the base station 604 also include an overall frequency range.

The UE RF filter 606 filters out the bandwidth that will not be used by the UE 602. The sensing bandwidth (e.g., 608, 618) may comprise a bandwidth over which energy may be measured to make a determination about channel access in unlicensed/shared spectrum. In some aspects, the sensing bandwidth for UE 602 and base station 604 may be a multiple of LBT bandwidth of 20 MHz. The UE active BWP 610 allows the UE to save power and not occupy the entire bandwidth all the time. The UE transmissions 612 are the bandwidths of the actual transmission from the UE 602.

The base station RF filter 614 filters out the bandwidth that may not be within the operating channel bandwidth of the base station. The network operating channel bandwidth 616 refers to a channel that may be used for transmission by the base station. The base station transmissions 620 are the bandwidths of the actual transmission from the base station 604.

Aspects provided herein provide a configuration for a channel access mechanism where a contending node may perform energy detection decisions as a function of transmit power. In some aspects, the channel access mechanism may allow the contending node to perform simultaneous energy detection decisions on multiple subbands, such that contention access rules may be defined to allow dynamic use of transmit power/energy sensing threshold per transmission burst. The contending node may use different sensing thresholds and corresponding different transmit powers on each subband in order to occupy multiple subbands concurrently.

Figure 7:
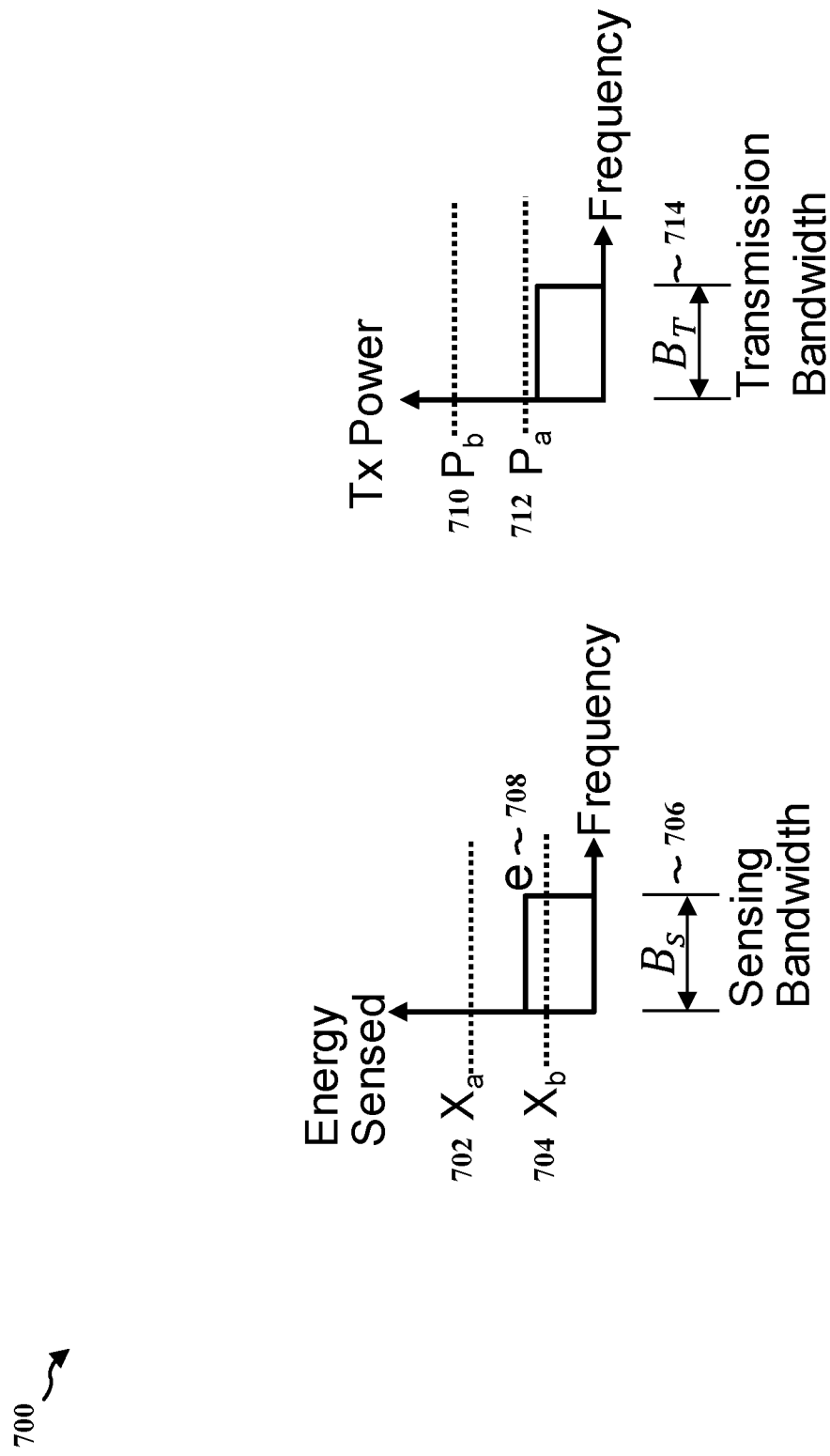
FIG. 7 illustrates an example of a power adaptive clear channel assessment.

FIG. 7 illustrates an example 700 of a power adaptive clear channel assessment. In some aspects, a single energy measurement e 708 may be performed over a sensing bandwidth 706 of an operating channel for a clear channel assessment for the contending node. The contending node may perform an LBT procedure over the channel bandwidth or a BWP bandwidth. In some aspects, a unit of LBT bandwidth may be defined, such that the contending node may perform the LBT procedure in all of the units of LBT bandwidth to be transmitted in of the channel bandwidth. In some aspects, the unit of LBT bandwidth may be based on a function of the channel, carrier or BWP bandwidth. For example, the size of the unit of LBT bandwidth may increase with the channel, carrier or BWP bandwidth. For example, for 100 MHz channel bandwidth, the LBT bandwidth may be 20 MHz, and for 2000 MHz channel bandwidth, the LBT bandwidth may be 400 MHz. In some aspects, the LBT bandwidth size may be based on the carrier/channel or BWP bandwidth. In some aspects, the subbands that are sensed as part of the energy detection decisions may comprise the unit of LBT bandwidth. A contention slot clear channel assessment decision may be provided as a function of transmit power P. For example, a sequence of decisions may be provided based on transmit power, such that the operating channel may be determined as unavailable for transmit power values greater than a threshold, while the operating channel may be determined as available for transmit power values less than the threshold. The operating channel may be considered as busy or unavailable for a transmit power P if Q>X(P), where Q is the energy measurement e 708 and X(P) is the threshold. The threshold may be expressed by the following equation:

$$X(P) = -80 \text{ dBm} + 10 * \log 10\left(\frac{P_{max}}{P_{out}}\right) +$$
$$10 * \log 10 (\text{Operating Channel } BW \text{ in MHz})$$

For example, the energy measurement e 708 may be the energy sensed within a sensing bandwidth 706. The energy measurement e 708 may be greater than the energy $X_b$ 704, but less than the energy $X_a$ 702. The energy measurement e 708 being greater than energy $X_b$ 704 may indicate that too much interference may be present for the corresponding power value $P_b$ 710 within the sensing bandwidth 706, such that the operating channel or transmission bandwidth 714 may be determined as being unavailable for power value $P_b$ 710. The energy measurement e 708 being less than energy $X_a$ 702 may indicate that there may not be an issue with interference for the corresponding power value $P_a$ 712 within the sensing bandwidth 706, such that the operating channel or transmission bandwidth 714 may be determined as being available for power value $P_a$ 712. As such, the contending node may transmit within the transmission bandwidth 714 at the power value $P_a$ 712, but may not transmit within the transmission bandwidth at the power value $P_b$ 710. The contending node may also transmit within the transmission band at power values that are less than power value $P_a$ 712.

Figure 8:
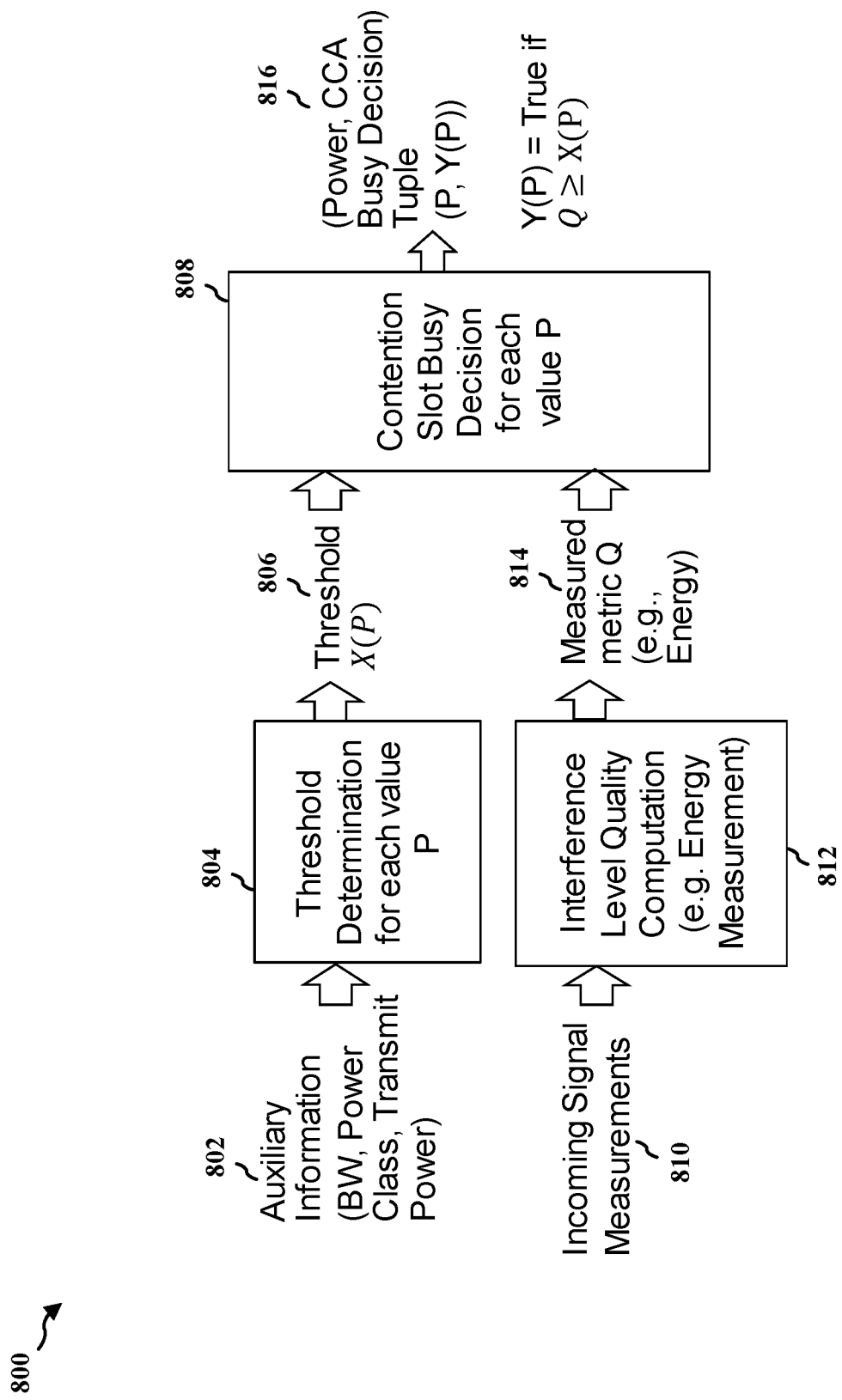
FIG. 8 illustrates an example of a power adaptive clear channel assessment.

FIG. 8 illustrates an example 800 of a power adaptive clear channel assessment. Auxiliary information 802 may be provided for the threshold determination 804. The auxiliary information 802 may include information related to bandwidth, power class, or transmit power. The threshold determination 804 may account for the auxiliary information 802 while performing the threshold determination 804 for each power value P in order to determine a threshold X(P) 806 as a function of the transmit power. The incoming signal measurements 810 may include the energy measurements, as shown as measurement e 708 in FIG. 7. The interference level quality computation 812 may account for the signal measurements 810 in order to determine a measured metric Q 814 to determine if the signal measurements exceed or are under an interference level (e.g., $X_a$ 702 or $X_b$ 704). A contention slot busy decision 808 may be determined based on the measured metric Q 814 and threshold X(P) 806. For example, the operating channel may be determined as busy if Q≥X(P). In some aspects, if a base station or network entity is transmitting broadcast signals (e.g., SSB), the operation with different transmit powers at different times may be disabled. For example, if broadcast signals are transmitted by a base station to the contending node during the measurement of the energy e 708 in the sensing bandwidth, then the energy measurement may be disabled for a period of time. The energy measurement may resume afterwards.

Figure 9:
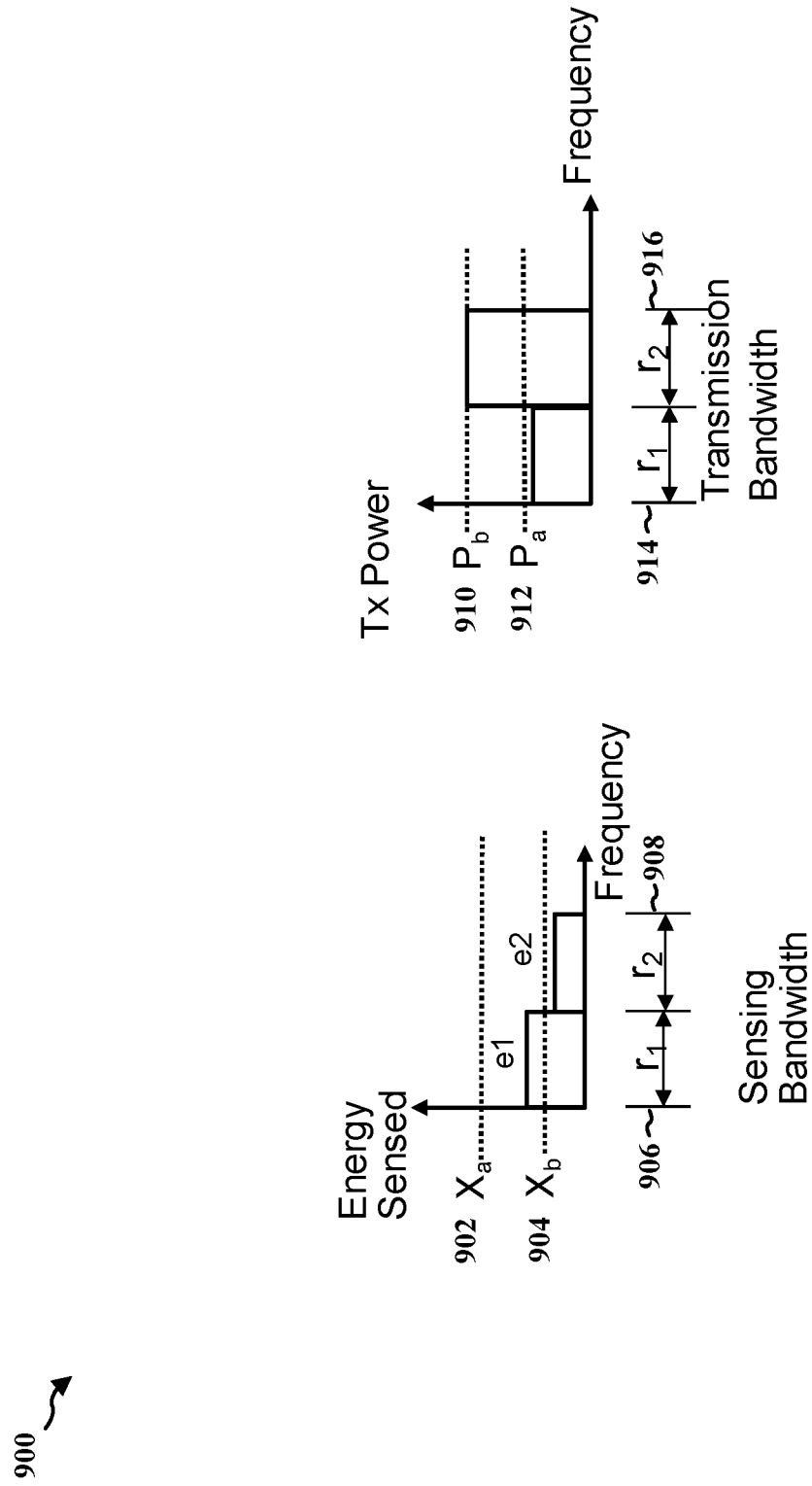
FIG. 9 illustrates an example of a power adaptive multiple subband clear channel assessment.

FIG. 9. illustrates an example 900 of a power adaptive multiple subband clear channel assessment. In some aspects, multiple energy sensing measurements may be performed over the operating channel on different subbands for a single clear channel assessment decision at a contending node. A maximum permissible power or EIRP $X_a$ 902, $X_b$ 904 may be identified in each subband 906, 908 to consider the clear channel assessment slot. A contending node may access the channel under LBT procedure using the clear channel assessment decision for each transmit power (e.g., $P_b$ 910, $P_a$ 912) in each subband that does not exceed the permissible power in the subband. In some aspects, the contending node may perform multiple LBT procedures. The contending node may perform a respective LBT procedure for each channel bandwidth separately. In some aspects, the contenting node may perform a single LBT procedure over all the CCs. In some aspects, a unit of LBT bandwidth may be defined, such that the contending node may perform the LBT procedure in all of the units of LBT bandwidth to be transmitted in of the channel bandwidth in each CC. For example, the subband energy measurements (e.g., e1, e2 of FIG. 9) in subbands $r_1$ 906 and $r_2$ 908 of the sensing bandwidth may result in a determination that the operating channel is available under a maximum permissible subband powers tuple $(P_1, P_2)=(P_a, P_b)$, respectively. This may allow for faster channel access for a wider band in wideband unlicensed operation. The threshold may be expressed by the following equation:

$$X(P) = -80 \text{ dBm} + 10 * \log 10\left(\frac{P_{max}}{P_{out}}\right) +$$
$$10 * \log 10 (\text{Operating Channel } BW \text{ in MHz})$$

As such, the threshold may be a function of the channel bandwidth depending on the subband configuration. For example, in some aspects, the subband or sensing bandwidth $r_2$ 908 may comprise a wider or greater bandwidth in comparison to subband or sensing bandwidth $r_1$ 906, such that subband or sensing bandwidth $r_2$ 908 may have a higher threshold based on the above threshold equation. For example, the subband energy measurements e1, e2 in subbands r1, r2, may lead to a clear channel assessment decision of being available under the maximum permissible subband powers tuple $(P_1, P_2)=(P_a, P_b)$ respectively.

In some aspects, if a base station or a network entity is transmitting broadcast signals (e.g., SSB), the operation with different transmit powers at different subbands may be disabled. In some aspects, if a UE is using a single carrier waveform, such as but not limited to DFT-s-OFDM, the operation with different transmit powers on different subbands may be disabled.

Figure 10:
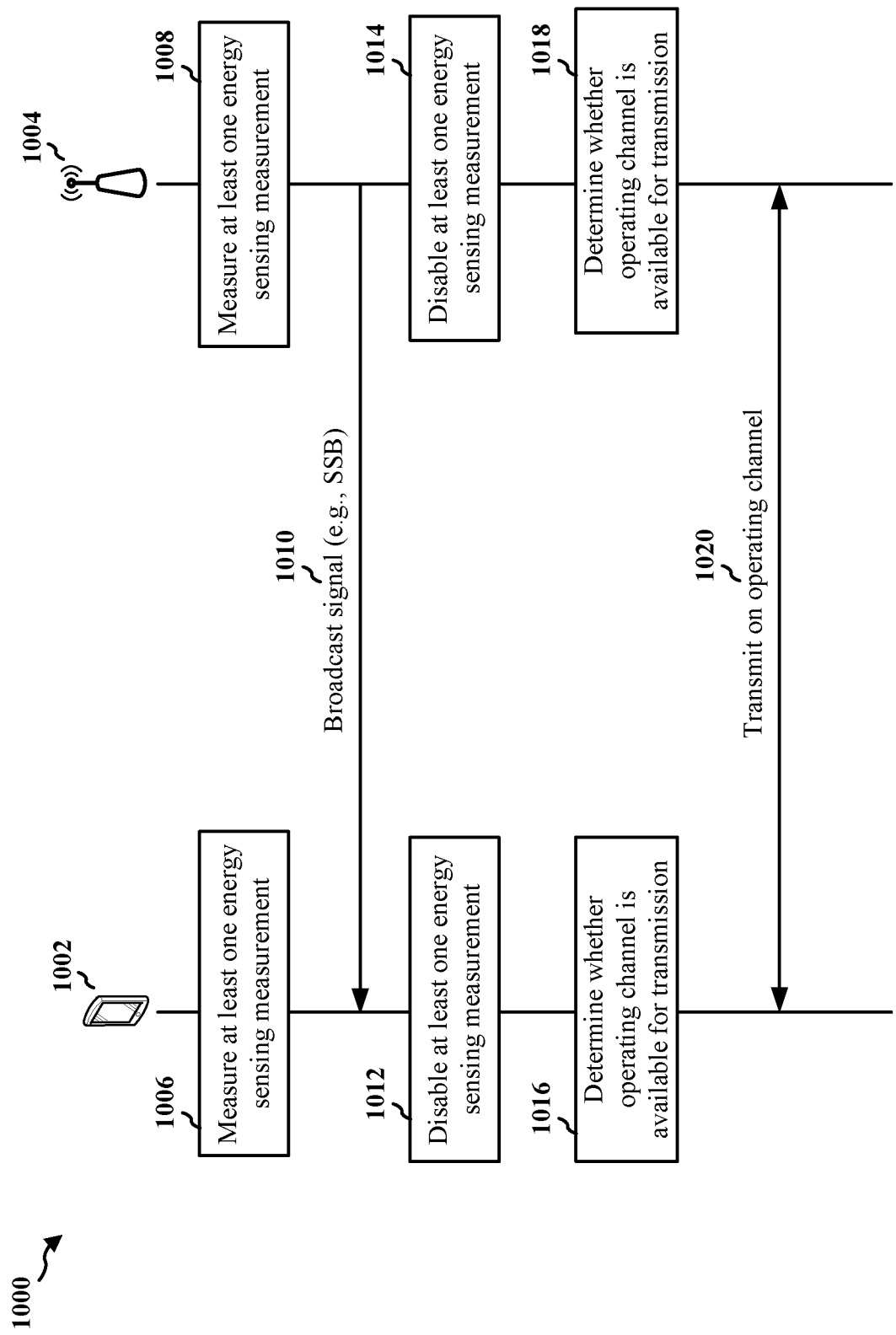
FIG. 10 is a call flow diagram of signaling between a UE and a base station in accordance with certain aspects of the disclosure.

FIG. 10 is a call flow diagram 1000 of signaling between a UE 1002 and a base station 1004. The base station 1004 may be configured to provide a cell. The UE 1002 may be configured to communicate with the base station 1004. For example, in the context of FIG. 1, the base station 1004 may correspond to base station 102/180 and, accordingly, the cell may include a geographic coverage area 110 in which communication coverage is provided and/or small cell 102' having a coverage area 110'. Further, a UE 1002 may correspond to at least UE 104. In another example, in the context of FIG. 3, the base station 1004 may correspond to base station 310 and the UE 1002 may correspond to UE 350.

As illustrated at 1006, the UE 1002 may measure at least one energy sensing measurement over an operating channel. The base station 1004, as illustrated at 1008, may measure at least one energy sensing measurement over an operating channel. In some aspects, the at least one energy sensing measurement may comprise an energy level measured of the operating channel within a sensing bandwidth. In the example of FIG. 10, the UE 1002 and the base station 1004 are shown as performing the same signaling step concurrently for ease of simplicity. However, the disclosure is not intended to be limited to the aspects presented herein. In some aspects, the UE 1002 may perform the signaling of FIG. 10 independent of the base station 1004, and the base station 1004 may perform the signaling of FIG. 10 independent of the UE 1002.

As illustrated at 1010, the base station 1004 may transmit broadcast signals (e.g., SSB). The UE 1002 may receive the broadcast signals (e.g., SSB) from the base station 1004. In some aspects, the base station 1004 may transmit the broadcast signals (e.g., SSB) during a sensing bandwidth.

As illustrated at 1012, the UE 1002 may disable the at least one energy sensing measurement. The UE 1002 may disable the at least one energy sensing measurement if a base station 1004 transmits broadcast signals (e.g., SSB) during the sensing bandwidth. The UE 1002 may disable the at least one energy sensing measurement if a network entity transmits broadcast signals during the sensing bandwidth. In some aspects, the base station 1004 may disable the at least one energy sensing measurement. The base station 1004, at 1014, may disable the at least one energy sensing measurement if the base station 1004 is transmitting broadcast signals (e.g., SSB) during the sensing bandwidth. The base station 1004 may disable the at least one energy sensing measurement if a network entity transmits broadcast signals during the sensing bandwidth.

As illustrated at 1016, the UE 1002 may determine whether the operating channel is available for transmission. The UE 1002 may determine whether the operating channel is available for transmission based on a threshold determination for one or more transmission power levels. As illustrated at 1018, the base station 1004 may determine whether the operating channel is available for transmission. The base station 1004 may determine whether the operating channel is available for transmission based on a threshold determination for one or more transmission power levels. In some aspects, the operating channel may be determined to be unavailable for transmission using one or more transmission power levels that are greater than the threshold determination. Each of the one or more transmission power levels may be measured against the threshold determination to determine whether the operating channel is available for transmission. In some aspects, the operating channel may be determined as available for transmission for each of the one or more transmission power levels. The determining whether the operating channel is available for transmission may be further based on the threshold determination for the one or more transmission power levels and an energy level measured within a sensing bandwidth. In some aspects, the at least one energy sensing measurement may comprise a plurality of energy sensing measurements measured over different subbands of the operating channel. A maximum transmission power level may be identified for each subband of the different subbands to determine whether the operating channel is available for transmission for each subband of the different subbands. The operating channel may be available for transmission for each subband with a transmission power level that does not exceed the maximum transmission power level.

As illustrated at 1020, the UE 1002 or the base station 1004 may transmit on the operating channel upon the determination that the operating channel is available for transmission. The UE 1002 or the base station 1004 may transmit on the operating channel upon the determination that the operating channel is available for transmission for the one or more transmission power levels. The one or more transmission power levels may be less than the threshold determination.

Figure 11:
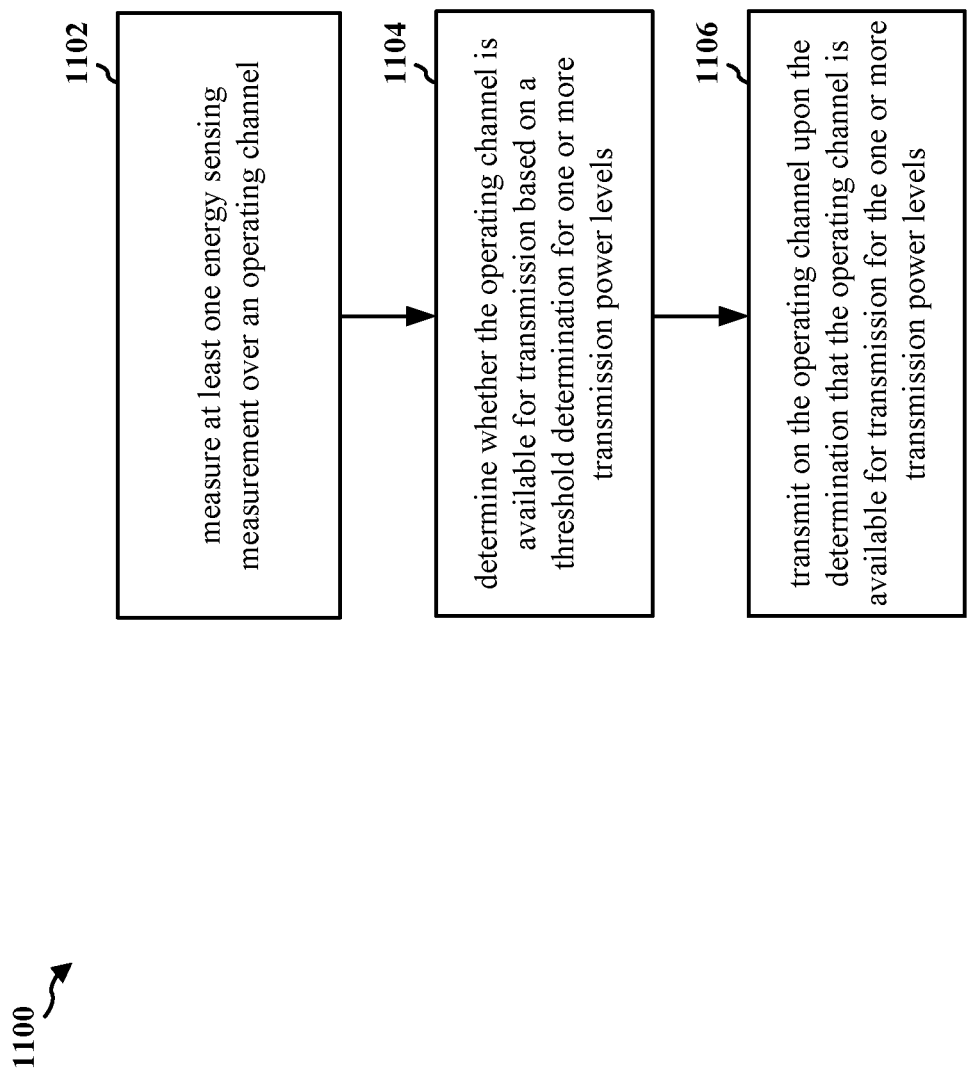
FIG. 11 is a flowchart of a method of wireless communication.

FIG. 11 is a flowchart 1100 of a method of wireless communication. The method may be performed by a UE or a component of a UE (e.g., the UE 104, 1002; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to perform a clear channel assessment based on one or more transmission power levels.

At 1102, the UE may measure at least one energy sensing measurement over an operating channel. For example, 1102 may be performed by measurement component 1340 of apparatus 1302. In some aspects, the at least one energy sensing measurement may comprise an energy level measured of the operating channel within a sensing bandwidth.

At 1104, the UE may determine whether the operating channel is available for transmission. For example, 1104 may be performed by availability component 1344 of apparatus 1302. The UE may determine whether the operating channel is available for transmission based on a threshold determination for one or more transmission power levels. In some aspects, the operating channel may be determined to be unavailable for transmission using one or more transmission power levels that are greater than the threshold determination. Each of the one or more transmission power levels may be measured against the threshold determination to determine whether the operating channel is available for transmission. In some aspects, the operating channel may be determined as available for transmission for each of the one or more transmission power levels. The determining whether the operating channel is available for transmission may be further based on the threshold determination for the one or more transmission power levels and an energy level measured within a sensing bandwidth. In some aspects, the at least one energy sensing measurement may comprise a plurality of energy sensing measurements measured over different subbands of the operating channel. A maximum transmission power level may be identified for each subband of the different subbands to determine whether the operating channel is available for transmission for each subband of the different subbands. The operating channel may be available for transmission for each subband with a transmission power level that does not exceed the maximum transmission power level.

At 1106, the UE may transmit on the operating channel upon the determination that the operating channel is available for transmission. For example, 1108 may be performed by channel component 1346 of apparatus 1302. The UE may transmit on the operating channel upon the determination that the operating channel is available for transmission for the one or more transmission power levels. The one or more transmission power levels may be less than the threshold determination.

Figure 12:
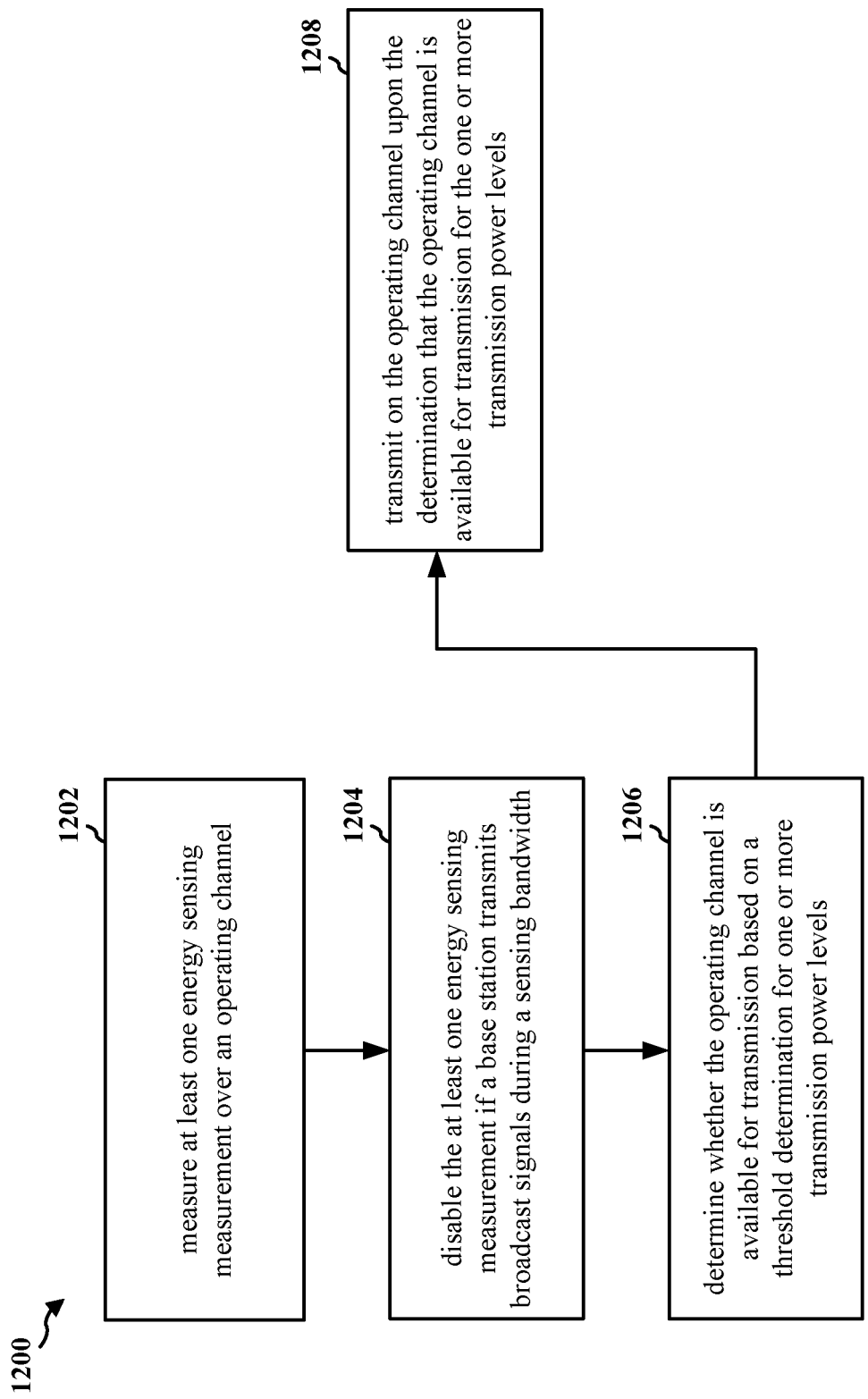
FIG. 12 is a flowchart of a method of wireless communication.

FIG. 12 is a flowchart 1200 of a method of wireless communication. The method may be performed by a UE or a component of a UE (e.g., the UE 104, 1002; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to perform a clear channel assessment based on one or more transmission power levels.

At 1202, the UE may measure at least one energy sensing measurement over an operating channel. For example, 1202 may be performed by measurement component 1340 of apparatus 1302. In some aspects, the at least one energy sensing measurement may comprise an energy level measured of the operating channel within a sensing bandwidth.

At 1204, the UE may disable the at least one energy sensing measurement. For example, 1204 may be performed by disable component 1342 of apparatus 1302. The UE may disable the at least one energy sensing measurement if a base station transmits broadcast signals (e.g., SSB) during a sensing bandwidth. The UE may disable the at least one energy sensing measurement if a network entity transmits broadcast signals during the sensing bandwidth.

At 1206, the UE may determine whether the operating channel is available for transmission. For example, 1206 may be performed by availability component 1344 of apparatus 1302. The UE may determine whether the operating channel is available for transmission based on a threshold determination for one or more transmission power levels. In some aspects, the operating channel may be determined to be unavailable for transmission using one or more transmission power levels that are greater than the threshold determination. Each of the one or more transmission power levels may be measured against the threshold determination to determine whether the operating channel is available for transmission. In some aspects, the operating channel may be determined as available for transmission for each of the one or more transmission power levels. The determining whether the operating channel is available for transmission may be further based on the threshold determination for the one or more transmission power levels and an energy level measured within a sensing bandwidth. In some aspects, the at least one energy sensing measurement may comprise a plurality of energy sensing measurements measured over different subbands of the operating channel. A maximum transmission power level may be identified for each subband of the different subbands to determine whether the operating channel is available for transmission for each subband of the different subbands. The operating channel may be available for transmission for each subband with a transmission power level that does not exceed the maximum transmission power level.

At 1208, the UE may transmit on the operating channel upon the determination that the operating channel is available for transmission. For example, 1208 may be performed by channel component 1346 of apparatus 1302. The UE may transmit on the operating channel upon the determination that the operating channel is available for transmission for the one or more transmission power levels. The one or more transmission power levels may be less than the threshold determination.

Figure 13:
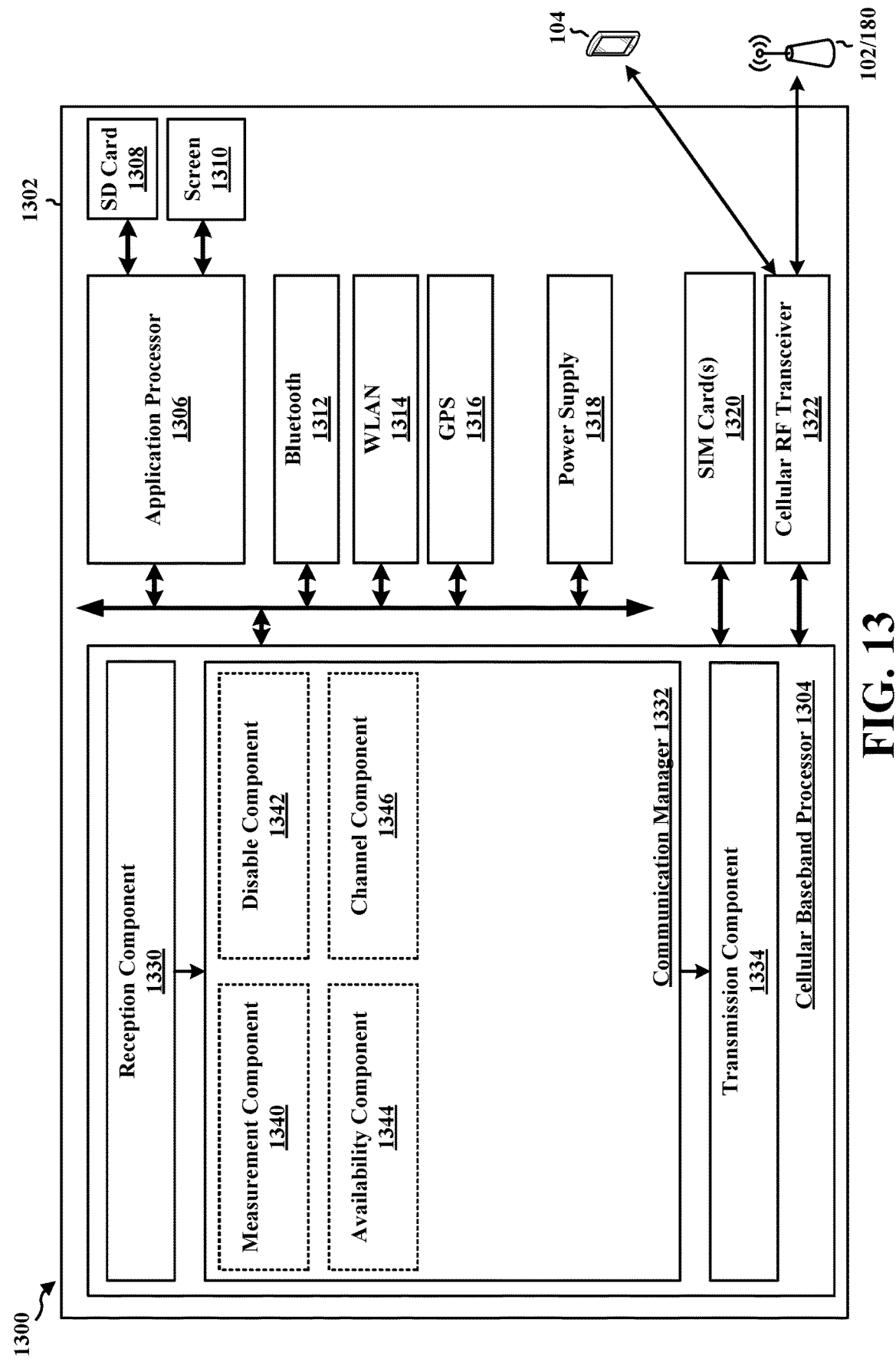
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a measurement component 1340 that is configured to measure at least one energy sensing measurement over an operating channel, e.g., as described in connection with 1102 of FIG. 11 or 1202 of FIG. 12. The communication manager 1332 further includes a disable component 1342 that is configured to disable the at least one energy sensing measurement, e.g., as described in connection with 1204 of FIG. 12. The communication manager 1332 further includes an availability component 1344 that is configured to determine whether the operating channel is available for transmission, e.g., as described in connection with 1104 of FIG. 11 or 1206 of FIG. 12. The communication manager 1332 further includes a channel component 1346 that is configured to transmit on the operating channel upon the determination that the operating channel is available for transmission, e.g., as described in connection with 1106 of FIG. 11 or 1208 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for measuring at least one energy sensing measurement over an operating channel. The apparatus includes means for determining whether the operating channel is available for transmission based on a threshold determination for one or more transmission power levels. The apparatus includes means for transmitting on the operating channel upon the determination that the operating channel is available for transmission for the one or more transmission power levels. The one or more transmission power levels are less than the threshold determination. The apparatus further includes means for disabling the at least one energy sensing measurement if a base station transmits broadcast signals during a sensing bandwidth. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
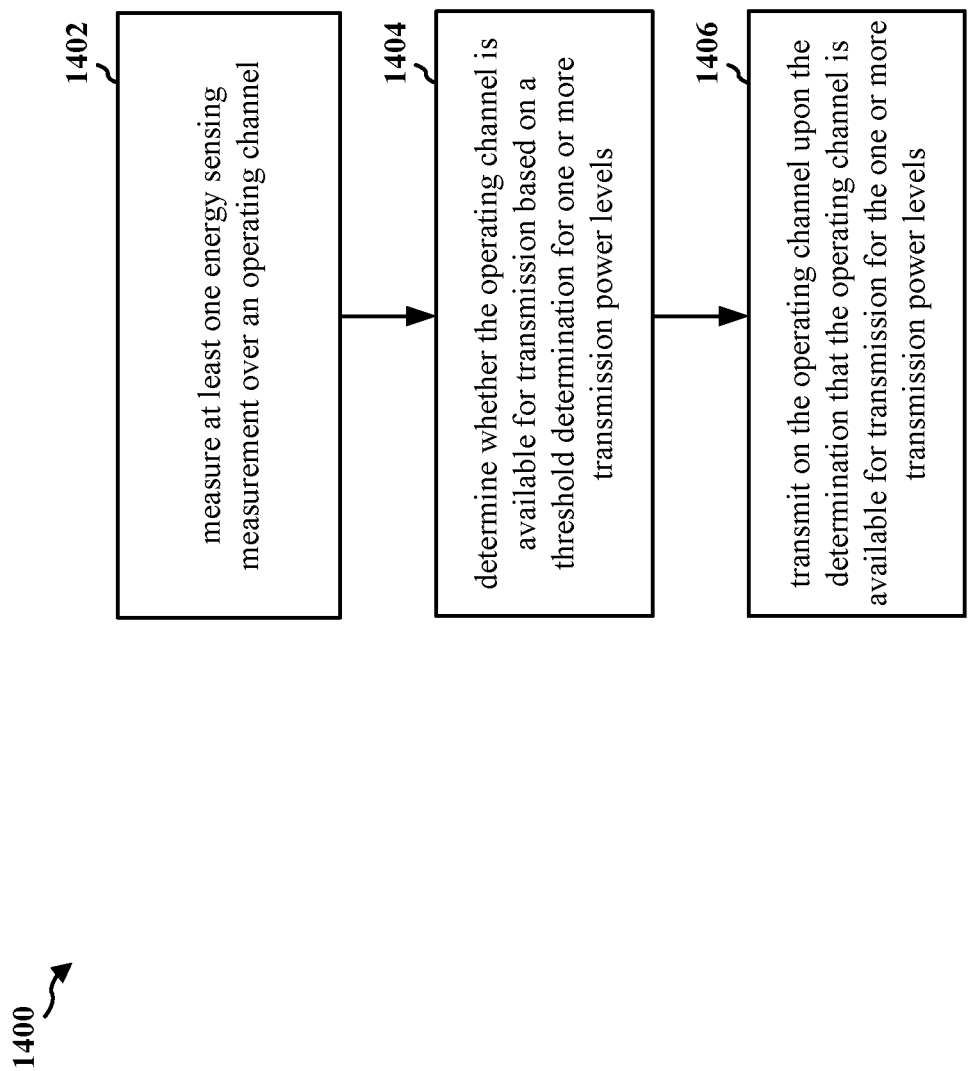
FIG. 14 is a flowchart of a method of wireless communication.

FIG. 14 is a flowchart 1400 of a method of wireless communication. The method may be performed by a base station or a component of a base station (e.g., the base station 102/180, 1004; the apparatus 1602; the baseband unit 1604, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to perform a clear channel assessment based on one or more transmission power levels.

At 1402, the base station may measure at least one energy sensing measurement over an operating channel. For example, 1402 may be performed by measurement component 1640 of apparatus 1602. In some aspects, the at least one energy sensing measurement may comprise an energy level measured of the operating channel within a sensing bandwidth.

At 1404, the base station may determine whether the operating channel is available for transmission. For example, 1404 may be performed by availability component 1644 of apparatus 1602. The base station may determine whether the operating channel is available for transmission based on a threshold determination for one or more transmission power levels. In some aspects, the operating channel may be determined to be unavailable for transmission using one or more transmission power levels that are greater than the threshold determination. Each of the one or more transmission power levels may be measured against the threshold determination to determine whether the operating channel is available for transmission. In some aspects, the operating channel may be determined as available for transmission for each of the one or more transmission power levels. The determining whether the operating channel is available for transmission may be further based on the threshold determination for the one or more transmission power levels and an energy level measured within a sensing bandwidth. In some aspects, the at least one energy sensing measurement may comprise a plurality of energy sensing measurements measured over different subbands of the operating channel. A maximum transmission power level may be identified for each subband of the different subbands to determine whether the operating channel is available for transmission for each subband of the different subbands. The operating channel may be available for transmission for each subband with a transmission power level that does not exceed the maximum transmission power level.

At 1406, the base station may transmit on the operating channel upon the determination that the operating channel is available for transmission. For example, 1406 may be performed by channel component 1646 of apparatus 1602. The base station may transmit on the operating channel upon the determination that the operating channel is available for transmission for the one or more transmission power levels. The one or more transmission power levels may be less than the threshold determination.

Figure 15:
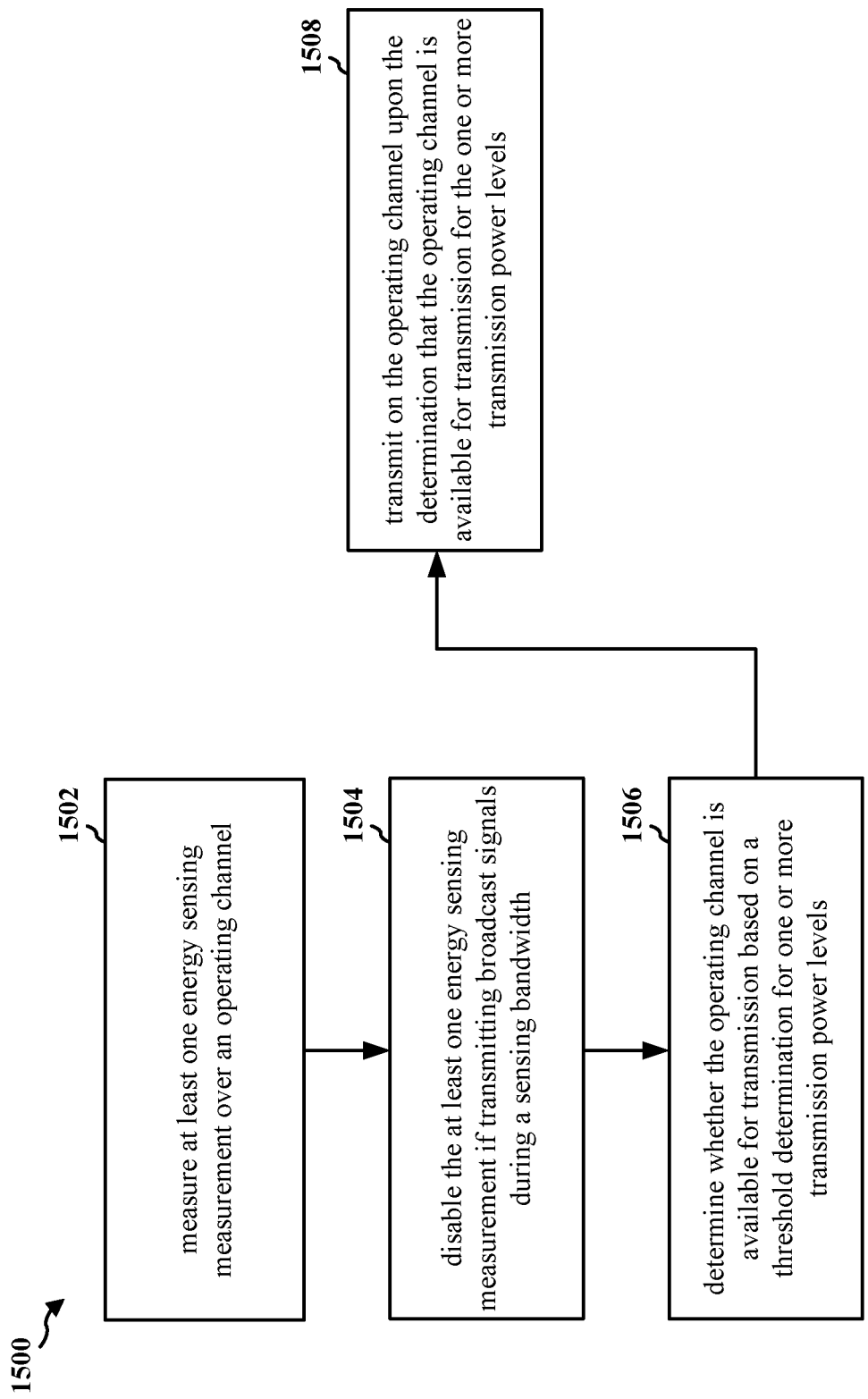
FIG. 15 is a flowchart of a method of wireless communication.

FIG. 15 is a flowchart 1500 of a method of wireless communication. The method may be performed by a base station or a component of a base station (e.g., the base station 102/180, 1004; the apparatus 1602; the baseband unit 1604, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to perform a clear channel assessment based on one or more transmission power levels.

At 1502, the base station may measure at least one energy sensing measurement over an operating channel. For example, 1502 may be performed by measurement component 1640 of apparatus 1602. In some aspects, the at least one energy sensing measurement may comprise an energy level measured of the operating channel within a sensing bandwidth.

At 1504, the base station may disable the at least one energy sensing measurement. For example, 1504 may be performed by disable component 1642 of apparatus 1602. The base station may disable the at least one energy sensing measurement if the base station is transmitting broadcast signals (e.g., SSB) during a sensing bandwidth. The base station may disable the at least one energy sensing measurement if a network entity is transmitting broadcast signals during the sensing bandwidth.

At 1506, the base station may determine whether the operating channel is available for transmission. For example, 1506 may be performed by availability component 1644 of apparatus 1602. The base station may determine whether the operating channel is available for transmission based on a threshold determination for one or more transmission power levels. In some aspects, the operating channel may be determined to be unavailable for transmission using one or more transmission power levels that are greater than the threshold determination. Each of the one or more transmission power levels may be measured against the threshold determination to determine whether the operating channel is available for transmission. In some aspects, the operating channel may be determined as available for transmission for each of the one or more transmission power levels. The determining whether the operating channel is available for transmission may be further based on the threshold determination for the one or more transmission power levels and an energy level measured within a sensing bandwidth. In some aspects, the at least one energy sensing measurement may comprise a plurality of energy sensing measurements measured over different subbands of the operating channel. A maximum transmission power level may be identified for each subband of the different subbands to determine whether the operating channel is available for transmission for each subband of the different subbands. The operating channel may be available for transmission for each subband with a transmission power level that does not exceed the maximum transmission power level.

At 1508, the base station may transmit on the operating channel upon the determination that the operating channel is available for transmission. For example, 1508 may be performed by channel component 1646 of apparatus 1602. The base station may transmit on the operating channel upon the determination that the operating channel is available for transmission for the one or more transmission power levels. The one or more transmission power levels may be less than the threshold determination.

Figure 16:
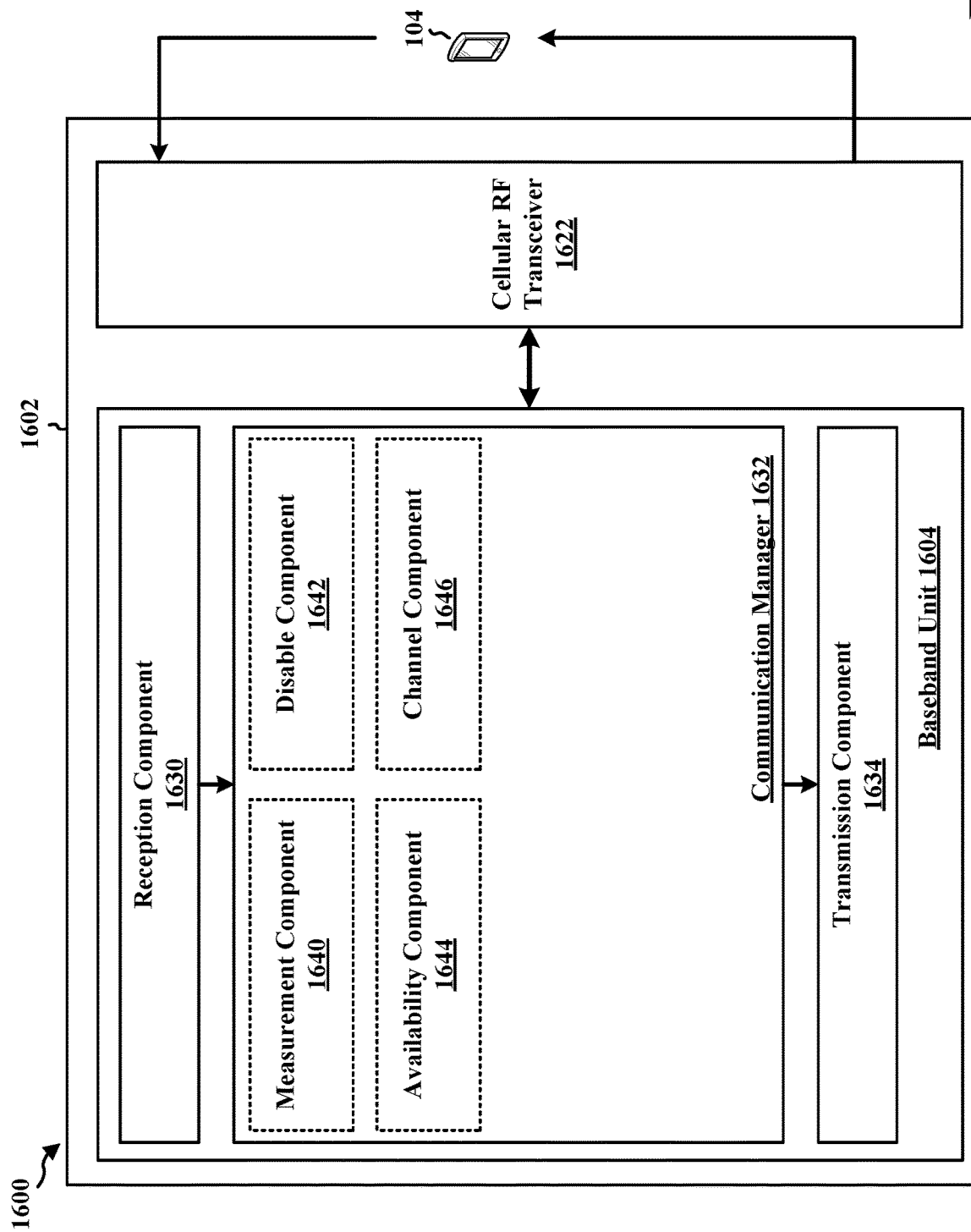
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a measurement component 1640 that may measure at least one energy sensing measurement over an operating channel, e.g., as described in connection with 1402 of FIG. 14 or 1502 of FIG. 15. The communication manager 1632 further includes a disable component 1642 that may disable the at least one energy sensing measurement, e.g., as described in connection with 1504 of FIG. 15. The communication manager 1632 further includes an availability component 1644 that may determine whether the operating channel is available for transmission, e.g., as described in connection with 1404 of FIG. 14 or 1506 of FIG. 15. The communication manager 1632 further includes a channel component 1646 that may transmit on the operating channel upon the determination that the operating channel is available for transmission, e.g., as described in connection with 1406 of FIG. 14 or 1508 of FIG. 15.

The apparatus may include additional components that perform each of the blocks of the algorithm in the flowcharts of FIGS. 14 and 15. As such, each block in the flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for measuring at least one energy sensing measurement over an operating channel. The apparatus includes means for determining whether the operating channel is available for transmission based on a threshold determination for one or more transmission power levels. The apparatus includes means for transmitting on the operating channel upon the determination that the operating channel is available for transmission for the one or more transmission power levels. The one or more transmission power levels are less than the threshold determination. The apparatus further includes means for disabling the at least one energy sensing measurement if the base station transmits broadcast signals during a sensing bandwidth. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to the memory and configured to measure at least one energy sensing measurement over an operating channel; determine whether the operating channel is available for transmission based on a threshold determination for one or more transmission power levels; and transmit on the operating channel upon a determination that the operating channel is available for transmission for the one or more transmission power levels, wherein the one or more transmission power levels are less than the threshold determination.

Aspect 2 is the apparatus of aspect 1, further including a transceiver coupled to the at least one processor.

Aspect 3 is the apparatus of any of aspects 1 and 2, further includes that the operating channel is determined as unavailable for transmission using the one or more transmission power levels that are greater than the threshold determination.

Aspect 4 is the apparatus of any of aspects 1-3, further includes that the at least one energy sensing measurement comprises an energy level measured of the operating channel within a sensing bandwidth.

Aspect 5 is the apparatus of any of aspects 1-4, further includes that each of the one or more transmission power levels are measured against the threshold determination to determine whether the operating channel is available for transmission.

Aspect 6 is the apparatus of any of aspects 1-5, further includes that the operating channel is determined as available or unavailable for transmission for each of the one or more transmission power levels.

Aspect 7 is the apparatus of any of aspects 1-6, further includes that to determine whether the operating channel is available for transmission is further based on the threshold determination for the one or more transmission power levels and an energy level measured within a sensing bandwidth.

Aspect 8 is the apparatus of any of aspects 1-7, further includes that the at least one processor is further configured to disable the at least one energy sensing measurement if a base station transmits broadcast signals during a sensing bandwidth.

Aspect 9 is the apparatus of any of aspects 1-8, further includes that the at least one energy sensing measurement comprises a plurality of energy sensing measurements measured over different subbands of the operating channel.

Aspect 10 is the apparatus of any of aspects 1-9, further includes that a maximum transmission power level is identified for each subband of the different subbands to determine whether the operating channel is available for transmission for each subband of the different subbands.

Aspect 11 is the apparatus of any of aspects 1-10, further includes that the operating channel is available for transmission for each subband with a transmission power level that does not exceed the maximum transmission power level.

Aspect 12 is a method of wireless communication for implementing any of aspects 1-11.

Aspect 13 is an apparatus for wireless communication including means for implementing any of aspects 1-11.

Aspect 14 is a computer-readable medium storing computer executable code, where the code when executed by a processor causes the processor to implement any of aspects 1-11.

Aspect 15 is an apparatus for wireless communication at a base station including at least one processor coupled to a memory and configured to measure at least one energy sensing measurement over an operating channel; determine whether the operating channel is available for transmission based on a threshold determination for one or more transmission power levels; and transmit on the operating channel upon a determination that the operating channel is available for transmission for the one or more transmission power levels, wherein the one or more transmission power levels are less than the threshold determination.

Aspect 16 is the apparatus of aspect 15, further including a transceiver coupled to the at least one processor.

Aspect 17 is the apparatus of any of aspects 15 and 16, further includes that the operating channel is determined to be unavailable for transmission using one or more transmission power levels that are greater than the threshold determination.

Aspect 18 is the apparatus of any of aspects 15-17, further includes that the at least one energy sensing measurement comprises an energy level measured of the operating channel within a sensing bandwidth.

Aspect 19 is the apparatus of any of aspects 15-18, further includes that each of the one or more transmission power levels are measured against the threshold determination to determine whether the operating channel is available for transmission.

Aspect 20 is the apparatus of any of aspects 15-19, further includes that the operating channel is determined as available for transmission for each of the one or more transmission power levels.

Aspect 21 is the apparatus of any of aspects 15-20, further includes that to determine whether the operating channel is available for transmission is further based on the threshold determination for the one or more transmission power levels and an energy level measured within a sensing bandwidth.

Aspect 22 is the apparatus of any of aspects 15-21, further includes that the at least one processor is further configured to disable the at least one energy sensing measurement if the base station transmits broadcast signals during a sensing bandwidth.

Aspect 23 is the apparatus of any of aspects 15-22, further includes that the at least one energy sensing measurement comprises a plurality of energy sensing measurements measured over different subbands of the operating channel.

Aspect 24 is the apparatus of any of aspects 15-23, further includes that a maximum transmission power level is identified for each subband of the different subbands to determine whether the operating channel is available for transmission for each subband of the different subbands.

Aspect 25 is the apparatus of any of aspects 15-24, further includes that the operating channel is available for transmission for each subband with a transmission power level that does not exceed the maximum transmission power level.

Aspect 26 is a method of wireless communication for implementing any of aspects 15-25.

Aspect 27 is an apparatus for wireless communication including means for implementing any of aspects 15-25.

Aspect 28 is a computer-readable medium storing computer executable code, where the code when executed by a processor causes the processor to implement any of aspects 15-25.

What is claimed is:

1. An apparatus for wireless communication at a user equipment (UE), comprising:
   a memory; and
   at least one processor coupled to the memory and configured to:
   perform at least one energy sensing measurement over an operating channel, wherein the at least one energy sensing measurement comprises a plurality of energy sensing measurements measured over different subbands of the operating channel;
   determine whether the operating channel is available for transmission based on a threshold determination for one or more transmission power levels measured over a bandwidth of the operating channel; and
   transmit on the operating channel upon a determination that the operating channel is available for transmission for the one or more transmission power levels, wherein the one or more transmission power levels are less than the threshold determination.

2. The apparatus of claim 1, further comprising a transceiver coupled to the at least one processor.

3. The apparatus of claim 1, wherein the operating channel is determined as unavailable for transmission using the one or more transmission power levels that are greater than the threshold determination.

4. The apparatus of claim 1, wherein the at least one energy sensing measurement comprises an energy level measured of the operating channel within a sensing bandwidth.

5. The apparatus of claim 1, wherein each of the one or more transmission power levels are measured against the threshold determination to determine whether the operating channel is available for transmission.

6. The apparatus of claim 5, wherein the operating channel is determined as available or unavailable for transmission for each of the one or more transmission power levels.

7. The apparatus of claim 1, wherein to determine whether the operating channel is available for transmission is further based on the threshold determination for the one or more transmission power levels and an energy level measured within a sensing bandwidth.

8. The apparatus of claim 1, wherein a maximum transmission power level is identified for each subband of the different subbands to determine whether the operating channel is available for transmission for each subband of the different subbands.

9. The apparatus of claim 8, wherein the operating channel is available for transmission for each subband with a transmission power level that does not exceed the maximum transmission power level.

10. An apparatus for wireless communication at a user equipment (UE), comprising:
    a memory; and
    at least one processor coupled to the memory and configured to:
    perform at least one energy sensing measurement over an operating channel;
    disable the at least one energy sensing measurement if a base station transmits broadcast signals during a sensing bandwidth;
    determine whether the operating channel is available for transmission based on a threshold determination for one or more transmission power levels measured over a bandwidth of the operating channel; and
    transmit on the operating channel upon a determination that the operating channel is available for transmission for the one or more transmission power levels, wherein the one or more transmission power levels are less than the threshold determination.

11. A method of wireless communication at a user equipment (UE), comprising:
    performing at least one energy sensing measurement over an operating channel, wherein the at least one energy sensing measurement comprises a plurality of energy sensing measurements measured over different subbands of the operating channel;
    determining whether the operating channel is available for transmission based on a threshold determination for one or more transmission power levels measured over a bandwidth of the operating channel; and
    transmitting on the operating channel upon a determination that the operating channel is available for transmission for the one or more transmission power levels, wherein the one or more transmission power levels are less than the threshold determination.

12. The method of claim 11, wherein the operating channel is determined as unavailable for transmission using the one or more transmission power levels that are greater than the threshold determination.

13. The method of claim 11, wherein the at least one energy sensing measurement comprises an energy level measured of the operating channel within a sensing bandwidth.

14. A method of wireless communication at a user equipment (UE), comprising:
    performing at least one energy sensing measurement over an operating channel;
    disabling the at least one energy sensing measurement if a base station transmits broadcast signals during a sensing bandwidth;
    determining whether the operating channel is available for transmission based on a threshold determination for one or more transmission power levels measured over a bandwidth of the operating channel; and
    transmitting on the operating channel upon a determination that the operating channel is available for transmission for the one or more transmission power levels, wherein the one or more transmission power levels are less than the threshold determination.

15. An apparatus for wireless communication at a base station, comprising:
a memory; and
at least one processor coupled to the memory and configured to:
perform at least one energy sensing measurement over an operating channel, wherein the at least one energy sensing measurement comprises a plurality of energy sensing measurements measured over different subbands of the operating channel;
determine whether the operating channel is available for transmission based on a threshold determination for one or more transmission power levels measured over a bandwidth of the operating channel; and
transmit on the operating channel upon a determination that the operating channel is available for transmission for the one or more transmission power levels, wherein the one or more transmission power levels are less than the threshold determination.

16. The apparatus of claim 15, further comprising a transceiver coupled to the at least one processor.

17. The apparatus of claim 15, wherein the operating channel is determined to be unavailable for transmission using one or more transmission power levels that are greater than the threshold determination.

18. The apparatus of claim 15, wherein the at least one energy sensing measurement comprises an energy level measured of the operating channel within a sensing bandwidth.

19. The apparatus of claim 15, wherein each of the one or more transmission power levels are measured against the threshold determination to determine whether the operating channel is available for transmission.

20. The apparatus of claim 19, wherein the operating channel is determined as available for transmission for each of the one or more transmission power levels.

21. The apparatus of claim 15, wherein to determine whether the operating channel is available for transmission is further based on the threshold determination for the one or more transmission power levels and an energy level measured within a sensing bandwidth.

22. The apparatus of claim 15, wherein a maximum transmission power level is identified for each subband of the different subbands to determine whether the operating channel is available for transmission for each subband of the different subbands.

23. The apparatus of claim 22, wherein the operating channel is available for transmission for each subband with a transmission power level that does not exceed the maximum transmission power level.

24. An apparatus for wireless communication at a base station, comprising:
a memory; and
at least one processor coupled to the memory and configured to:
perform at least one energy sensing measurement over an operating channel;
disable the at least one energy sensing measurement if the base station transmits broadcast signals during a sensing bandwidth;
determine whether the operating channel is available for transmission based on a threshold determination for one or more transmission power levels measured over a bandwidth of the operating channel; and
transmit on the operating channel upon a determination that the operating channel is available for transmission for the one or more transmission power levels, wherein the one or more transmission power levels are less than the threshold determination.

25. A method of wireless communication at a base station, comprising:
performing at least one energy sensing measurement over an operating channel, wherein the at least one energy sensing measurement comprises a plurality of energy sensing measurements measured over different subbands of the operating channel;
determining whether the operating channel is available for transmission based on a threshold determination for one or more transmission power levels measured over a bandwidth of the operating channel; and
transmitting on the operating channel upon a determination that the operating channel is available for transmission for the one or more transmission power levels, wherein the one or more transmission power levels are less than the threshold determination.

26. The method of claim 25, wherein the operating channel is determined to be unavailable for transmission using one or more transmission power levels that are greater than the threshold determination.

27. The method of claim 25, wherein the at least one energy sensing measurement comprises an energy level measured of the operating channel within a sensing bandwidth.

28. A method of wireless communication at a base station, comprising:
performing at least one energy sensing measurement over an operating channel;
disabling the at least one energy sensing measurement if the base station transmits broadcast signals during a sensing bandwidth;
determining whether the operating channel is available for transmission based on a threshold determination for one or more transmission power levels measured over a bandwidth of the operating channel; and
transmitting on the operating channel upon a determination that the operating channel is available for transmission for the one or more transmission power levels, wherein the one or more transmission power levels are less than the threshold determination.

* * * * *